United States Patent [19]

Delarbre et al.

[11] 4,161,344

[45] Jul. 17, 1979

[54] METHOD OF AND MEANS FOR ROTATABLY SUPPORTING A LOAD

[75] Inventors: Aimé Delarbre, Chatillon, France; Joachim Boesner, Velbert; Michael Blank, Wuppertal, both of Fed. Rep. of Germany

[73] Assignee: Kugelfischer Georg Schafer & Co., Schweinfurt, Fed. Rep. of Germany

[21] Appl. No.: 842,360

[22] Filed: Oct. 14, 1977

Related U.S. Application Data

[63] Continuation-in-part of Ser. No. 820,356, Jul. 29, 1977, abandoned.

[30] Foreign Application Priority Data

Aug. 3, 1976 [DE] Fed. Rep. of Germany ....... 2634776

[51] Int. Cl.² .............................................. F16C 19/00
[52] U.S. Cl. ..................................................... 308/222
[58] Field of Search .................................. 212/66–69; 104/46; 308/135, 136, 137, 219, 220, 221, 222, 223

[56] References Cited

U.S. PATENT DOCUMENTS 486,589 11/1892 Patnoe .................................. 308/220
3,937,540 2/1976 Morizur .............................. 308/222

FOREIGN PATENT DOCUMENTS 57247 8/1967 German Democratic Rep.
2418056 10/1975 Fed. Rep. of Germany.

*Primary Examiner*—Robert G. Sheridan
*Attorney, Agent, or Firm*—Karl F. Ross

[57] ABSTRACT

A mounting for a load rotating or oscillating about a vertical axis comprises a stationary annular support member centered on that axis and provided with inner and outer peripheral guide tracks engaged by two rotatable annular carrier members, either the stationary member or the rotatable members being split along a horizontal plane for positive interfitting. A load-carrying platform overlying the three coaxial members is separated from the stationary member and from one of the carrier members while being secured to the other carrier member through the intermediary of an interposed spacer for rotary entrainment thereof. The spacer, in the form of a multiplicity of ring segments, can be transferred to the previously idle rotatable member upon excessive wear of the guide track associated with the carrier member previously entrained.

9 Claims, 5 Drawing Figures

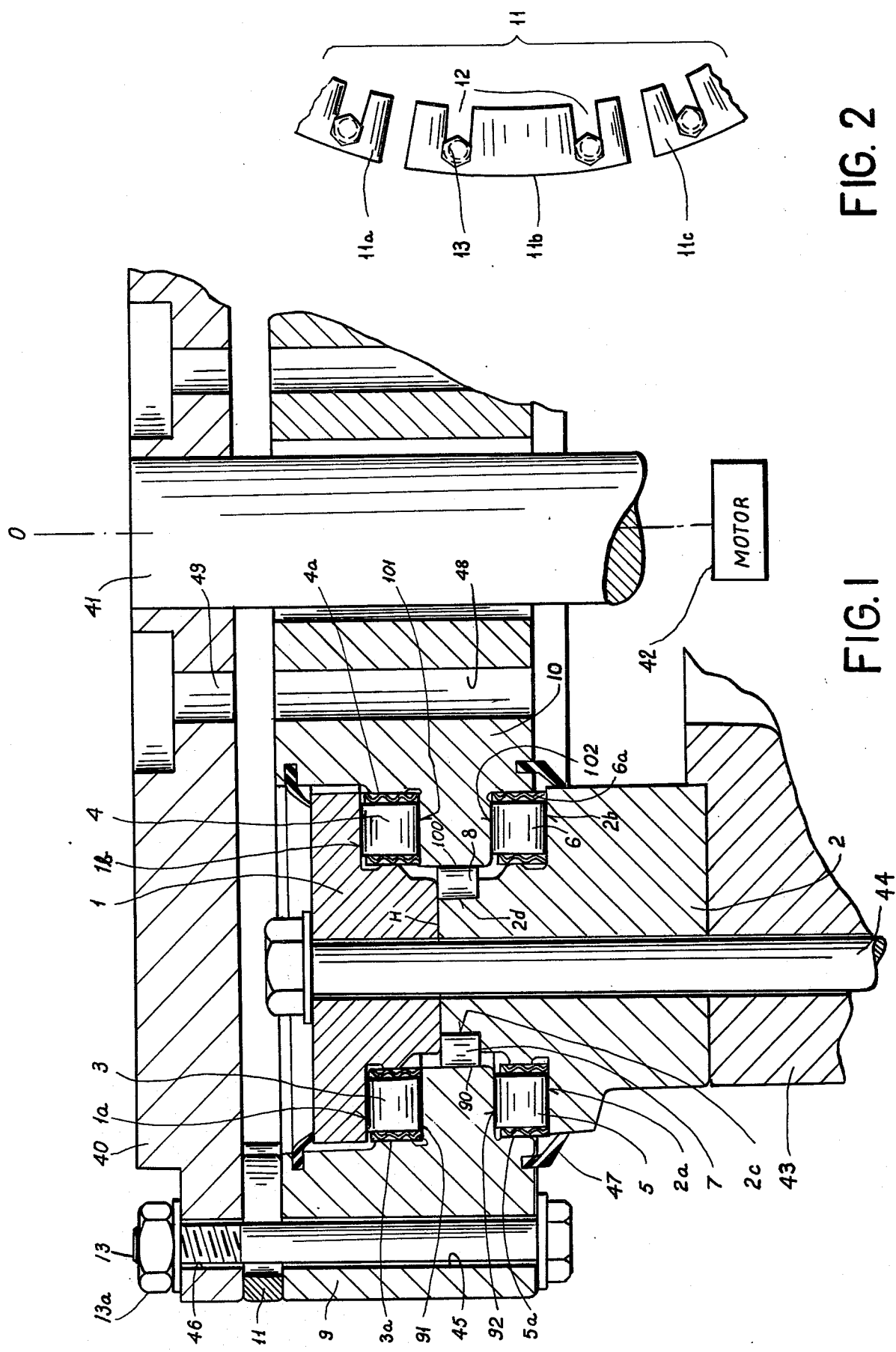

METHOD OF AND MEANS FOR ROTATABLY SUPPORTING A LOAD

CROSS-REFERENCE TO RELATED APPLICATION

This is a continuation-in-part of our copending application Ser. No. 820,356 filed July 29, 1977 and now abandoned.

FIELD OF THE INVENTION

Our present invention relates to a heavy-duty mounting for a load, such as a crane or a turret, which is designed to rotate about a vertical axis through a full turn or a fraction thereof.

BACKGROUND OF THE INVENTION

In such a mounting, considerable axial, radial and tilting forces must be absorbed by suitable bearings, usually a combination of journal and thrust bearings using rotary bodies such as rollers. Generally, the load is mounted on a platform resting on an annular carrier which is centered on the axis of rotation and is supported via the aforementioned journal and thrust bearings on a stationary annular member secured to the base. The two coaxial annular supports provide a free space around the axis in which the means for rotating the platform, such as a motor-driven shaft, can be accommodated.

A drawback of this conventional type of mounting is that the surfaces contacted by the bearing rollers are subject to considerable wear under load and thus require frequent replacement. In order to reduce the down-time caused by these repairs, it has already been proposed to provide a rotatable carrier with an ancillary set of bearing elements which are normally inactive but can be made effective to support all or part of the load when the main bearing elements encounter too much resistance due to excessive wear. Even in their inactive condition, however, the ancillary bearing elements are set in rotation by the associated contact surfaces and may therefore produce grooves in these surfaces even before a substantial part of the load is transferred to them.

OBJECTS OF THE INVENTION

An object of our present invention, therefore, is to provide an improved method of supporting a load-carrying platform, allowing for continuous operation with only a minor interruption upon the manifestation of excessive wear, with avoidance of the aforestated drawback. A related object is to provide a rotary mounting designed to implement that method.

SUMMARY OF THE INVENTION

In accordance with our present invention, a load-supporting platform rotatable or oscillatable about a vertical axis is provided with stationary support means including an annular member centered on that axis, this annular member forming inner and outer peripheral guide tracks respectively engaged by a first and a second annular carrier coaxial therewith. The platform, spacedly overlying the two carriers as well as the track-forming stationary member, is selectively connectable with either carrier with the aid of fastening means which include a spacer interposable between the platform and the previously inactive carrier for holding the platform out of contact with the previously active carrier.

Advantageously, pursuant to another feature of our invention, the spacer comprises a multiplicity of ring segments which are interposable between the platform and either the outer or the inner carrier, these segments being closely juxtaposed when supporting the inner carrier and more widely separated when supporting the outer carrier. Either the stationary track-forming member or the carriers may be split along a horizontal plane to facilitate a positive interfitting thereof, generally through the intermediary of rollers or equivalent bearing elements.

BRIEF DESCRIPTION OF THE DRAWING

The above and other features of our invention will now be described in detail, reference being made to the accompanying drawing in which:

FIG. 1 is an axial sectional view of a representative part of a mounting according to our invention for a heavy-duty load;

FIG. 2 is a fragmentary top view of an array of ring segments used as a spacer in the mounting of FIG. 1;

SPECIFIC DESCRIPTION

Figure 3:
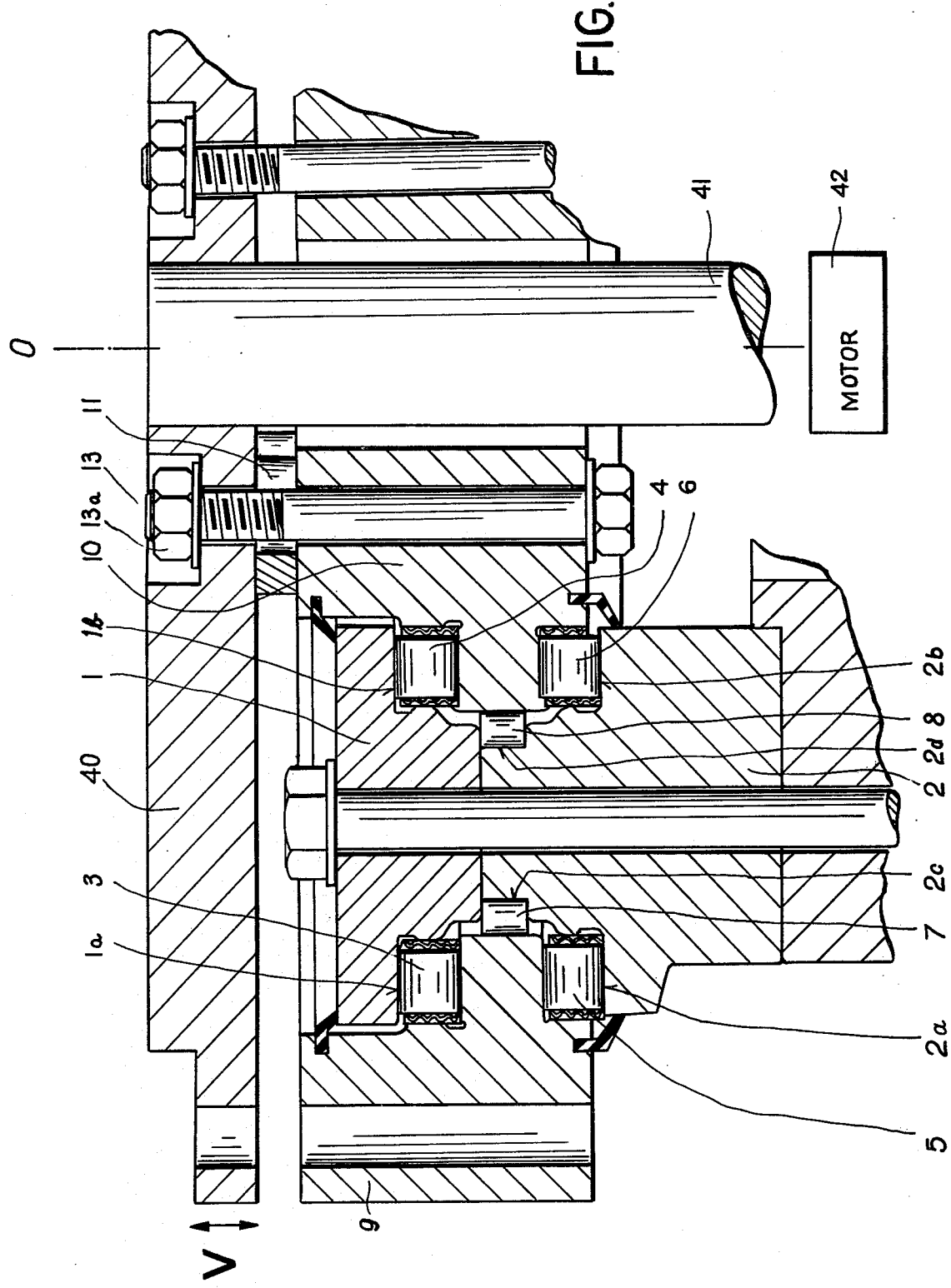
FIG. 3 is a view similar to FIG. 1, showing the mounting reassembled in a different way.

In FIG. 1 we have shown a platform 40 designed to support a heavy-duty load, e.g. a tower crane, for partial or full rotation about a vertical axis O. Platform 40 is rigid with a vertical shaft 41 which is driven, through a transmission not further illustrated, by a motor 42.

A supporting structure for platform 40 comprises a base 43 to which a stationary annular member, split along a horizontal plane H into an upper ring 1 and a lower ring 2, is attached with the aid of a set of bolts 44. Ring 1 forms a pair of inner and outer horizontal track surfaces 1a, 1b confronting similar track surfaces 2a and 2b of ring 2; the latter ring also has vertical inner and outer peripheral track surfaces 2c and 2d.

An outer annular carrier 9 engages the supporting member 1, 2 through the intermediary of a journal bearing constituted by a set of rollers 3 in contact with track surface 1a and another set of rollers 5 in contact with track surface 2a; a further set of rollers 7 are held captive between carrier 9 and track surface 2c, adjacent the dividing plane H, to act as a thrust bearing. In an analogous manner, an inner annular carrier 10 is interfitted with supporting member 1, 2 through the intermediary of journal rollers 4 in contact with track surface 1b and journal rollers 6 in contact with track surface 2b as well as thrust rollers 8 in contact with track surface 2d. Via the journal and thrust bearings 3–8, the two carriers 9 and 10 are freely rotatable, with reference to each other and to their common support 1, 2, about axis O.

Rollers 3–6 are held in position by annular cages 3a–6a as is well known per se. To minimize the loss of lubricant from the roller tracks, and to prevent the penetration of moisture into same, carriers 9 and 10 are provided with lip seals 47 contacting the rings 1 and 2. Guide surfaces of carrier 9 engaged by rollers 7, 3 and 5 have been designated 90, 91 and 92, respectively; corresponding roller-guiding surfaces of carrier 10 have been indicated at 100, 101 and 102.

As further shown in FIG. 1, platform 40 rests on the outer carrier 9 through the intermediary of a spacer 11 represented, as shown in FIG. 2, by an array of peripherally separated ring segments 11a, 11b, 11c etc. Each ring segment has a pair of radial slots 12 designed to accommodate respective mounting bolts 13 (only one shown in FIG. 1) which traverse aligned bores 45 and 46 in carrier 9 and platform 40 and are engaged by nuts 13a. The segmented spacer 11 has the dual function of uniting the platform 40 with the carrier 9 and holding the platform out of contact with the other carrier 10 and the stationary supporting ring 1.

After prolonged operation, one or more of the track surfaces 91, 92, 1a, 2a engaged by rollers 3 and 5 may show signs of wear which would normally require a resurfacing or replacement of one or more of the coacting support members 1, 2 and 9. Thanks to the presence of the alternate carrier 10, however, such repair work can be deferred to a time when the machine incorporating the illustrated mounting is not in use, enabling continuation of its current operation after a quick changeover. Thus, it is merely necessary to arrest the motor 42, remove the mounting bolts 13 and slightly elevate the platform 40 above its supporting structure whereupon the ring segments 11 are repositioned above the carrier 10 to align their slots 12 with bores 48 and 49 in the carrier and in platform 40. After the bolts 13 have been inserted into the bores and slots so aligned, platform 40 is lowered onto the relocated spacers 11 whereupon nuts 13a are tightened on the bolts as shown in FIG. 3. The raising and lowering of the platform (which for this purpose must have a certain vertical mobility on or together with its shaft 41, as indicated by an arrow V in FIG. 3) can be carried out with the aid of a hydraulic jack or hoist, for example. With the system reassembled as shown in FIG. 3, rotation or oscillation of the platform 40 by motor 42 can be resumed.

Figure 4:
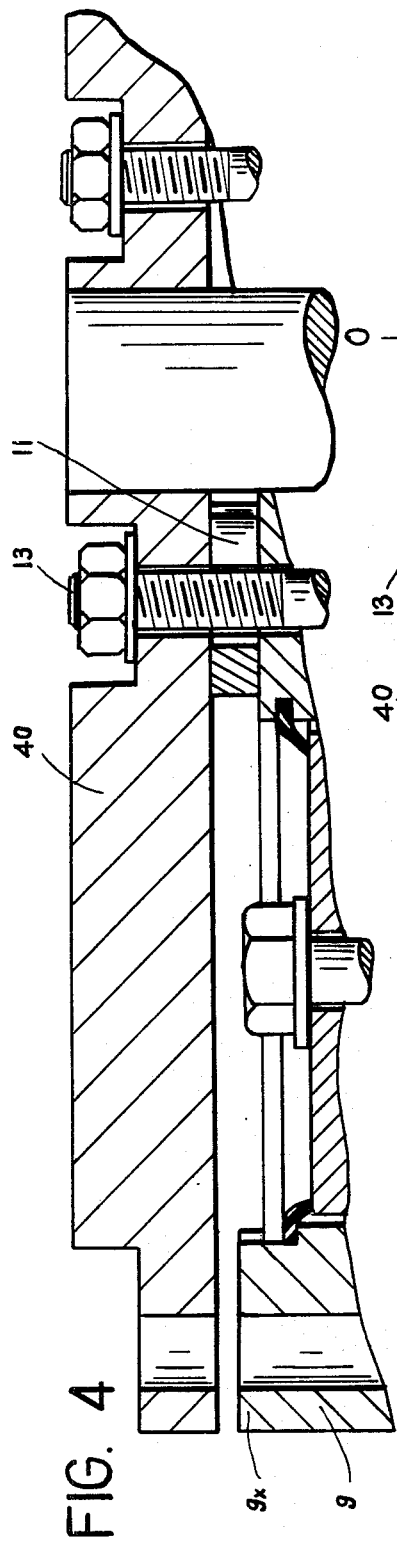
FIG. 4 is another view similar to FIG. 1, showing a partial modification of the mounting.

As illustrated in FIG. 4, the carrier 9 may be provided with a permanent integral spacer 9x—in the form of a continuous peripheral ridge or peripherally separated bosses—of a height lower than that of ring segments 11. In its initial mode of operation, i.e. with platform 40 seated on the outer carrier 9, the segments 11 are removed so that the platform comes to rest on the projection or projections 9x while still being physically separated from members 1 and 10. Upon being changed to its alternate mode of operation, the platform is lifted sufficiently to allow for insertion of segments 11 between itself and carrier 10 to produce the assembly shown in FIG. 4. It will be noted that in this case, as in the arrangement of FIG. 3, platform 40 stands clear of carrier 9. Obviously, the permanent spacer of lesser height could be provided on carrier 10 rather than on carrier 9, with insertion of spacer 11 between platform 40 and carrier 9 in the initial mode of operation.

Figure 5:
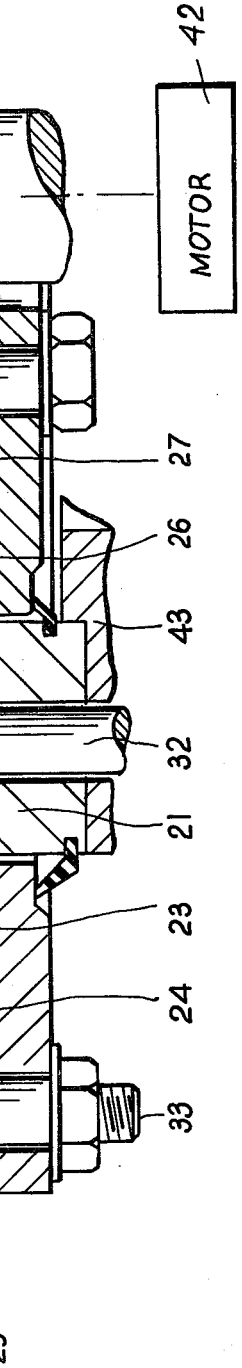
FIG. 5 is a further view similar to FIG. 1, illustrating another embodiment.

In FIG. 5 we have illustrated another embodiment in which the split stationary support 1, 2 of the preceding Figures has been replaced by a unitary ring 21 whereas each of the two rotatable annular carriers has been divided into an upper and a lower ring portion, namely rings 28 and 29 in the case of the outer carrier and rings 30 and 31 in the case of the inner carrier. Supporting member 21 is secured to base 43 by means of bolts 32 (only one shown), other bolts 33 serving to hold together the currently inactive rotatable carrier (here the outer carrier consisting of rings 28 and 29) which is not traversed by the mounting bolts 13. The two carriers are again rotatably connected with the stationary support via journal rollers 22, 23 and 25, 26 as well as thrust rollers 24 and 27. The operation of the system of FIG. 5 is analogous to that of the preceding embodiment.

It will be noted that, in each instance, the changeover from one mode of support to the other can be carried out without any disassembly of platform 40, shaft 41 and associated driving components.

Naturally, a permanent spacer as shown in FIG. 4 could also be used with the embodiment of FIG. 5.

We claim:

1. A mounting for a load to be at least partly rotated about a vertical axis, comprising:
    stationary support means including an annular member centered on said axis and provided with inner and outer peripheral guide tracks;
    rotatable support means including a first and a second annular carrier coaxial with said annular member, said first carrier engaging said outer guide track, said second carrier engaging said inner guide track;
    a load-carrying platform spacedly overlying said carriers and said member; and
    fastening means for selectively connecting said platform with either of said carriers while leaving the respectively other carrier separated therefrom, said fastening means including spacing means interposable between said platform and said other carrier for holding said platform out of contact with the carrier previously connected therewith.

2. A mounting as defined in claim 1 wherein said spacing means comprises a multiplicity of ring segments interposable between said platform and either of said carriers.

3. A mounting as defined in claim 1 wherein one of said support means is split along a horizontal plane for positive interfitting with the other of said support means.

4. A mounting as defined in claim 3, further comprising first bearng means inserted between said first carrier and said outer guide track, and second bearing means inserted between said second carrier and said inner guide track.

5. A mounting as defined in claim 4 wherein each of said bearing means comprises a set of upper journal rollers, a set of lower journal rollers, and a set of thrust rollers between said upper and lower journal rollers.

6. A mounting as defined in claim 5 wherein said thrust rollers are disposed adjacent said horizontal plane.

7. A method of mounting a load-carrying platform for at least partial rotation about a vertical axis, comprising the steps of:
    independently journaling a first and a second annular carrier on a common support forming respective tracks therefor;
    resting said platform on said first carrier in spaced relationship with said second carrier while imparting rotary motion to the platform in a first operating mode; and
    upon the manifestation of wear on the track associated with said first carrier, resting said platform on said second carrier in spaced relationship with said first carrier before imparting further rotary motion to the platform in a second operating mode, said spaced relationship being maintained in at least one of said modes by the interposition of a spacer between the platform and the carrier supporting same.

8. A method as defined in claim 7 wherein the same spacer is interposed between the first carrier and the platform in said first operating mode and between the second carrier and the platform in said second operating mode.

9. A method as defined in claim 8 wherein the platform is temporarily elevated during transfer of the spacer from the first to the second carrier.

* * * * *